US010807151B2

(12) United States Patent
Wang et al.

(10) Patent No.: US 10,807,151 B2
(45) Date of Patent: Oct. 20, 2020

(54) METHOD FOR REDUCING METAL-MOLD REACTION

(71) Applicant: ASK Chemicals LLC, Dublin, OH (US)

(72) Inventors: Xianping Wang, Dublin, OH (US); Mark Stancliffe, Herefordshire (GB); Christian Priebe, Wuelfrath (DE); Joerg Kroker, Powell, OH (US)

(73) Assignee: ASK Chemicals LLC, Wilmington, DE (US)

( * ) Notice: Subject to any disclaimer, the term of this patent is extended or adjusted under 35 U.S.C. 154(b) by 441 days.

(21) Appl. No.: 15/812,402

(22) Filed: Nov. 14, 2017

(65) Prior Publication Data

US 2018/0065171 A1 Mar. 8, 2018

Related U.S. Application Data

(63) Continuation of application No. PCT/US2016/032668, filed on May 16, 2016.

(60) Provisional application No. 62/161,923, filed on May 15, 2015, provisional application No. 62/161,603, filed on May 14, 2015.

(51) Int. Cl.
*B22C 1/22* (2006.01)
*B22C 9/02* (2006.01)
*B22C 1/20* (2006.01)
*C08G 18/54* (2006.01)
*C08K 5/06* (2006.01)
*C08K 5/5415* (2006.01)

(52) U.S. Cl.
CPC ............ *B22C 1/2273* (2013.01); *B22C 1/205* (2013.01); *B22C 1/22* (2013.01); *B22C 9/02* (2013.01); *C08G 18/542* (2013.01); *C08K 5/06* (2013.01); *C08K 5/5415* (2013.01)

(58) Field of Classification Search
CPC ......... B22C 1/2273; B22C 1/22; B22C 1/205; B22C 9/02; C08G 18/542; C08K 5/06; C08K 5/5415
See application file for complete search history.

(56) References Cited

U.S. PATENT DOCUMENTS

| 3,485,797 | A | * | 12/1969 | Janis | .................. C07C 43/1782 526/71 |
| 6,017,978 | A | * | 1/2000 | Chen | ...................... B22C 1/205 523/143 |
| 6,288,139 | B1 | * | 9/2001 | Skoglund | .............. B22C 1/2273 523/139 |
| 6,465,542 | B1 | * | 10/2002 | Torbus | .................. B22C 1/2273 523/142 |
| 9,493,602 | B2 | | 11/2016 | Cornelissen et al. | |
| 2005/0020723 | A1 | * | 1/2005 | Chen | ..................... B22C 1/2266 523/139 |
| 2006/0270753 | A1 | * | 11/2006 | Chen | ..................... B22C 1/2266 523/139 |
| 2011/0005702 | A1 | * | 1/2011 | Priebe | ................... B22C 1/2273 164/47 |
| 2011/0269902 | A1 | | 11/2011 | Strunk et al. | |
| 2013/0225718 | A1 | | 8/2013 | Ladegourdie et al. | |
| 2013/0292083 | A1 | | 11/2013 | Ladegourdie et al. | |
| 2014/0090306 | A1 | | 4/2014 | Egeler et al. | |
| 2017/0282239 | A1 | * | 10/2017 | Lenzen | ..................... B22C 9/10 |

FOREIGN PATENT DOCUMENTS

JP S62107840 A 5/1987

OTHER PUBLICATIONS

International Preliminary Report on Patentability for PCT/US2016/32668, dated Nov. 14, 2017, 7 pages. (Year: 2017).*

* cited by examiner

*Primary Examiner* — William P Fletcher, III
(74) *Attorney, Agent, or Firm* — Standley Law Group LLP; Stephen L. Grant; Jeffrey S. Standley

(57) ABSTRACT

Defects can arise in a product of a metal casting process from reactions occurring at a metal-mold interface. A method that reduces the defects uses an organic binder system by introducing a separate third component to a two-part polyurethane-based binder system used in the cold box or no bake process. The third part is added only after the first two parts are mixed with a refractory molding material to provide a shapeable foundry mix. The third part is an alkyl silicate, such as tetraethyl orthosilicate ("TEOS"), an alkyl orthoformate, such as trimethyl orthoformate (TMOF) or triethyl orthoformate (TEOF), or combinations thereof.

8 Claims, No Drawings

METHOD FOR REDUCING METAL-MOLD REACTION

CROSS-REFERENCE TO RELATED APPLICATIONS

This application is a by-pass continuation of, and claims priority to, PCT/US2016/032668, which is a non-provisional of, and claims priority to, U.S. provisional applications Nos. 62/161,603, filed on 14 May 2015, and 62/161,923, filed on 15 May 2015. Each application is incorporated by reference as if fully recited herein.

TECHNICAL FIELD

This invention relates to a three-part polyurethane-based binder system for use in the cold box or no bake process, in which the first and second parts comprise conventional binder components and the third part comprises an alkyl silicate, such as tetraethyl orthosilicate ("TEOS"), an alkyl orthoformate, such as trimethyl orthoformate (TMOF) or triethyl orthoformate (TEOF) or combinations thereof. The binder system reduces the amount of metal-mold reaction observed in the casting of some metals.

BACKGROUND OF THE ART

Professor John Campbell of the University of Birmingham in England developed a series of rules for making reliable castings. One of the problems that he noted involves defects arising near the surface of non-ferrous metal castings. An explanation proposed for these defects is the reduction of atmospheric water by a reactive aluminum surface, resulting in dissolved hydrogen in the liquid metal. As the metal solidifies, the solubility of the hydrogen in the metal is reduced, causing bubbles of the hydrogen in the solid metal. These can cause premature failures. In this application, this effect will be referred to as "metal mold reaction," as it is a reaction occurring at the interface of the metal with the mold in which a part is being formed.

In U.S. Pat. No. 6,288,139 to Skoglund ("Skoglund '139"), a foundry binder system is disclosed in which a Part I phenolic resin component and a Part II polyisocyanate component are used, where the Part II component contains from 0.1 to 5 weight % of an orthoester, the percentage being based upon the weight of the Part II component. Typically, these binder systems use the Parts I and II in a 55/45 weight ratio. Skoglund '139 recognizes that orthoesters have been known for stabilizing organic isocyanates, although the uses taught prior to Skoglund '139 did not extend to foundry binders and foundry mixes. When used in the Part II component, orthoesters were observed to improve tensile strength of the foundry shapes and the Part II components were observed to have lower turbidity at the time of use.

The specific details of the polyol and polyisocyanate components are well documented in the art, so it is not further described here. However, there is a solvent employed with at least one of the components, and, commonly, a solvent is used with both components. Both the polyol and the polyisocyanate components will be used in a liquid form. Although liquid polyisocyanate can be used in undiluted form, a solid or viscous polyisocyanate can be used in the form of a solution in an organic solvent. In some instances, the solvent can account for up to 80% by weight of the polyisocyanate solution. When the polyol used in the first component is a solid or highly viscous liquid, suitable solvents will be used to adjust viscosity to allow for adequate application properties.

Metal mold reaction, as particularly defined here, is an ongoing problem for which the primary suggestion is to eliminate moisture from the mold when the metal pour occurs.

SUMMARY

These shortcomings of the prior art are overcome at least in part by the present invention, which is a method for reducing metal-mold reaction in a metal casting process. The method has the steps of:

providing an organic binder system and a refractory molding material, the organic binder system provided as three components that are not combined until the time of use, the third component comprising at least one of: an alkyl silicate and an alkyl orthoformate;

mixing at least the first two components of the organic binder system with the refractory molding material to provide a shapeable foundry mix;

forming the shapeable foundry mix into a mold or core; and curing the mold or core formed.

In some of the methods, all three components of the organic binder system are combined prior to being mixed with the refractory molding material.

In other methods involving the inventive concept, only the first and second components of the organic binder system are combined prior to being mixed with the refractory molding material. In some of these methods, the third component of the organic binder system is applied to the formed mold or core. In some of these latter methods, the third component is applied by spraying the third component only onto surfaces of the mold or core that will be exposed to molten metal during the metal casting process.

In some embodiments, the first component is a polyol component, comprising a phenolic base resin with at least 2 hydroxy groups per molecule, the polyol component being devoid of polyisocyanates; and the second component is a polyisocyanate component, comprising a polyisocyanate compound with at least 2 isocyanate groups per molecule, the isocyanate component being devoid of polyols; such that when the first and second components are combined, either with or without the third component, and cured with an amine catalyst, a phenolic urethane polymer results.

In many of the methods involving the inventive concept, the alkyl silicate, when present, of the third component is tetraethyl orthosilicate ("TEOS").

In many of the methods, the alkyl orthoformate, when present, is trimethyl orthoformate ("TMOF"). In some of these methods the alkyl orthoformate, when present, also includes triethyl orthoformate ("TEOF"), occasionally even without TEOS.

In the method of the inventive concept, the third component is present in an amount representing from 4 to 6% of the weight of the combined first and second components.

DETAILED DESCRIPTION OF THE PREFERRED EMBODIMENTS

Other work conducted by the inventors has indicated value in providing a third part to a foundry binder system to provide tensile strength in foundry shapes that is maintained in the presence of high relative humidity. In such work, providing the Part III component allows the respective parts to be maintained separately until the time of use.

One solution to these metal mold reaction problems has apparently been found in a binder composition that uses a three-component approach to provide a polyurethane cold box (PUCE) binder system. In such a system, the Part I component comprises a polyol base resin and a set of suitable complements, the Part II component comprises a polyisocyanate accompanied by a set of suitable complements and the Part III component comprises at least one of an alkyl silicate, such as tetraethyl ortho silicate ("TEOS") and an alkyl orthoester, with trimethyl orthoformate ("TMOF") and triethyl orthoformate ("TEOF") being exemplary compounds that could be used either individually or in combination.

Trimethyl orthoformate, which is also referred to as trimethoxymethane, is also identified by the CAS number 149-73-5. Structurally, it has three methoxy groups that are attached to a carbon atom. The fourth bond of the carbon atom is to a hydrogen atom. TMOF is commercially available from Sigma-Aldrich and other sources.

Triethyl orthoformate, which is also referred to as diethoxymethoxyethane and 1,1,1-triethoxymethane, is also identified by the CAS number 122-51-0. Structurally, it has three ethoxy groups that are attached to a carbon atom. The fourth bond of the carbon atom is to a hydrogen atom. TEOF is commercially available from Sigma-Aldrich and other sources at 98% purity.

Tetraethyl ortho silicate, which is also referred to as tetraethoxysilane, is identified by the CAS number 78-10-4. Structurally, it has four ethyl groups that are attached to the oxygen atoms in an orthosilicate nucleus. TEOS is commercially available at 99.999% purity from Sigma-Aldrich and other sources.

The phenolic resin and the polyisocyanate can be selected from the group consisting of the compounds conventionally known to be used in the cold-box process or the no-bake process, as the inventive concept is not believed to inhere in these portions of the composition.

Referring more particularly to the phenolic resin, it is generally selected from a condensation product of a phenol with an aldehyde, especially an aldehyde of the formula RCHO, where R is hydrogen or an alkyl moiety having from 1 to 8 carbon atoms. The condensation reaction is carried out in the liquid phase, typically at a temperature below 130 Degrees C. A number of such phenolic resins are commercially available and will be readily known.

A preferred phenolic resin component would comprise a phenol resin of the benzyl ether type. It can be expedient in individual cases to use an alkylphenol, such as o-cresol, p-nonylphenol or p-tert-butylphenol, in the mixture, in particular with phenol, for the preparation of the phenol resin. Optionally, these resins can feature alkoxylated end groups which are obtained by capping hydroxymethylene groups with alkyl groups like methyl, ethyl, propyl and butyl groups.

As to the polymeric isocyanate, it may be preferred to use a polyisocyanate component that comprises diphenylmethane diisocyanate (MDI), although a number of commercially-available polymeric isocyanates are directed for this specific market. The isocyanate component (second component) of the two-component binder system for the cold-box or polyurethane no-bake process usually comprises an aliphatic, cycloaliphatic or aromatic polyisocyanate having preferably between two and five isocyanate groups; mixtures of such polyisocyanates may also be used. Particularly suitable polyisocyanates among the aliphatic polyisocyanates are, for example, hexamethylene diisocyanate, particularly suitable ones among the alicyclic polyisocyanates are, for example, 4,4'-dicyclohexylmethane diisocyanate and particularly suitable ones among the aromatic polyisocyanates are, for example, 2,4'- and 2,6'-toluene diisocyanate, diphenylmethane diisocyanate and their dimethyl derivatives. Further examples of suitable polyisocyanates are 1,5-naphthalene diisocyanate, triphenylmethane triisocyanate, xylene diisocyanate and their methyl derivatives, polymethylenepolyphenyl isocyanates (polymeric MDI), etc. Although all polyisocyanates react with the phenol resin with formation of a crosslinked polymer structure, the aromatic polyisocyanates are preferred in practice. Diphenylmethane diisocyanate (MDI), triphenylmethane triisocyanate, polymethylene polyphenyl isocyanates (polymeric MDI) and mixtures thereof are particularly preferred.

The polyisocyanate is used in concentrations which are sufficient to effect curing of the phenol resin. In general, 10-500% by weight, preferably 20-300% by weight, based on the mass of (undiluted) phenol resin used, of polyisocyanate are employed. The polyisocyanate is used in liquid form; liquid polyisocyanate can be used in undiluted form, and solid or viscous polyisocyanates are used in the form of a solution in an organic solvent, it being possible for the solvent to account for up to 80% by weight of the polyisocyanate solution.

Several solvents can be used in the Part I and Part II components. One is a dibasic ester, commonly a methyl ester of a dicarboxylic acid. Sigma-Aldrich sells a dibasic ester of this type under the trade designation DBE, which is believed to have the structural formula $CH_3O_2C(CH_2)_nCO_2CH_3$, where n is an integer between 2 and 4. Another solvent is kerosene, which is understood to be the generic name of a petroleum distillate cut having a boiling point in the range of 150 to 275 Degrees C.

Other solvents that are useful are sold commercially as AROMATIC SOLVENT 100, AROMATIC SOLVENT 150, and AROMATIC SOLVENT 200, which are also respectively known as SOLVESSO 100, SOLVESSO 150 and SOLVESSO 200. They have the respective CAS Registry numbers 64742-95-6, 64742-95-5 and 64742-94-5. While SOLVESSO is an expired registered trademark of Exxon, the solvents are referred to by those designations even when originating from other sources.

Performance additives are also included in the respective parts of the formulation. In the Part I component, an especially preferred performance additive is hydrofluoric acid (which is commonly used as a 49% aqueous solution, but it may be used in different dilution or with a different diluent). Coupling agents and additives based on fatty acids can also be used. In the Part II component, the preferred performance additives would include modified fatty oil and bench life extenders, which would include phosphoroxytrichloride and benzyl phosphoroxy dichloride.

In one particular formulation, the Part I component would consist of, on a weight basis:

| INGREDIENT | Weight % |
|---|---|
| Phenolic base resin | 40-65 |
| Aromatic solvents | 35-60 |
| Performance additives | 0.05-5.0 |
| TOTAL | 100.00 |

A corresponding Part II component would consist, on a weight basis, of the following:

| INGREDIENT | Weight % |
| --- | --- |
| MDI | 60-85 |
| Aromatic solvents | 10-20 |
| Kerosene | 1-10 |
| Performance additives | 0.1-5 |
| TOTAL | 100.00 |

In the same formulation, the Part III component would comprise TMOF and TEOF, at any weight ratio from 100/0 to 0/100.

The tendency to produce gas porosity was evaluated by using a stepcone-cored cylindrical casting. In this method, the Part I and Part II components were mixed with sand for three minutes, using a standard sand mixer. The Part III component can be premixed on sand or it can be added at the same time as the Part I and Part II components. After the mixing of the components and sand, the mixed sand was hand rammed into a stepcone pattern, gassed for four seconds with a standard amine, specifically, dimethylisopropylamine (DMIPA, CAS 996-35-0), and purged with air for twenty seconds.

The stepcone core and a diagram of the test method used are depicted in FIGS. 1 to 4 of "Test Casting Evaluating of Chemical Binder Systems" by Tordoff et al., AFS Transactions, 80-74, pp 149-158. FIG. 5 of that publication shows a sectioned stepcone casting that reveals subsurface porosity defects.

Under the Tordoff test, molten aluminum (700 degrees C.) is poured into the mold assembly, and allowed to solidify. The stepcone casting is removed from the mold and sectioned to rate the amount of subsurface porosity near the surface of the stepcone core. The severity of the porosity is indicated by assigning a numerical rating: 1=Excellent, 2=Good, 3=Fair, 4=Poor, 5=Very poor. The numerical rating is assigned based on the number and size of the porosities, their locations and corresponding metal/sand ratio. A rating of 1 or 2 generally implies little to no subsurface porosity defect, which is excellent in actual foundry practice. A rating of 4 or higher indicates the presence of severe subsurface porosity defects, and some actions (i.e., applying coating or improving venting) are needed in order to make castings with acceptable quality in actual foundry practice. In some tests where subsurface porosity is particularly severe, a rating of 5+ may be given, indicating off-scale gas porosity.

To demonstrate the positive effect on subsurface porosity provided by the Part III component, the stepcone casting test was conducted with stepcone cores made with different sand mixes. In each case, Parts I and II were a commercially available binder system available from ASK Chemicals, with Part I being ISOCURE FOCUS 100 and Part II being ISOCURE FOCUS 201, in a 55/45 weight ratio. In all of the cases, the binder was applied at a rate of 1% by weight of the combined Part I and Part II to a commercially available WEDRON 410 sand.

In Example A, there was no Part III component, that is, it was a baseline case.

In Example B, the Part III component was entirely TEOS (tetraethyl orthosilicate, CAS 78-10-4), present at 4% by weight, based on the binder. The Part III component was added to the sand at the same time as the binder.

In Example C, the Part III component was entirely TEOF at 4% by weight, based on binder. The Part III component was added at the same time as the binder.

In Example D, the Part III component was entirely TEOF, at 6% by weight, based on binder. However, instead of adding the Part III component to the sand mix, it was sprayed onto the exterior surface the stepcone core right after they were made.

When this testing was completed, the sectioned stepcone casting from Example A was examined and a rating of 4.5 ("poor") was assigned to the baseline case that lacked a Part III component.

Examination of the sectioned stepcone casting from Example B, which had the Part III component (TEOS only) added to the sand at the same time as the binder (combined Parts I and II), was assigned a rating of 3 ("improved").

The sectioned stepcone casting from Example C, where TEOF was substituted for TEOS as the Part III component which was added to the sand at the same time as the binder (combined Parts I and II), was assigned a rating of 2.5 ("good").

The examination of the Example D sectioned stepcone casting, where a higher amount of TEOF was used, but this time it was sprayed onto the surface of the formed stepcone core, rather than adding it to the sand mix, a rating of 2.5 ("good") was also assigned.

The examples demonstrate that the use of a separate Part III component, especially when it is TEOS, TEOF or possibly a combination of TEOS and TEOF, is an improvement over a method in which no Part III component is used. It is also expected that TMOF can be substituted for, or used in combination with, TEOF. This is the case even when the Part III component is not applied until after the sand and binder mixture are formed into a hardened core or mold.

What is claimed is:

1. A method for reducing defects in a metal product arising from a reaction occurring at a metal-mold interface in a metal casting process, comprising the steps of:
    providing an organic binder system provided as three components that are not combined until the time of use and a refractory molding material, wherein the first component is a polyol component, the second component is a polyisocyanate component, and the third component comprises at least one of: an alkyl silicate and an alkyl orthoformate;
    mixing only the first two components of the organic binder system with the refractory molding material to provide a shapeable foundry mix;
    forming the shapeable foundry mix into a mold or core; and
    curing the mold or core formed.

2. The method of claim 1, wherein the third component of the organic binder system is applied to the formed mold or core.

3. The method of claim 2, wherein the third component is applied by spraying the third component only onto surfaces of the mold or core that will be exposed to molten metal during the metal casting process.

4. The method of claim 1, wherein:
    the polyol component comprises a phenolic base resin with at least 2 hydroxy groups per molecule, the polyol component being devoid of polyisocyanates; and
    the polyisocyanate component comprises a polyisocyanate compound with at least 2 isocyanate groups per molecule, the isocyanate component being devoid of polyols;
    such that when the first and second components are combined, without the third component, and cured with an amine catalyst, a phenolic urethane polymer results.

5. The method of claim 1, wherein the alkyl silicate, when present, of the third component is tetraethyl orthosilicate ("TEOS").

6. The method of claim 5, wherein the alkyl orthoformate, when present, is trimethyl orthoformate ("TMOF").

7. The method of claim 5, wherein the alkyl orthoformate, when present, is triethyl orthoformate ("TEOF").

8. The method of claim 1, wherein the third component is present in an amount representing from 4 to 6% of the weight of the combined first and second components.

* * * * *